United States Patent
Rayner et al.

(10) Patent No.: US 9,387,630 B2
(45) Date of Patent: Jul. 12, 2016

(54) METHODS AND APPARATUS FOR MAKING FOAM COMPOSITES REINFORCED WITH FIBERS AND FIBER PRE-FORMS HAVING PARTICLES THEREIN

(75) Inventors: Kevin Rayner, Cambridge (CA); Nirmala Singh, Cambrige (CA)

(73) Assignee: Barrday Inc., Cambridge, Ontario (CA)

( * ) Notice: Subject to any disclaimer, the term of this patent is extended or adjusted under 35 U.S.C. 154(b) by 264 days.

(21) Appl. No.: 13/409,900

(22) Filed: Mar. 1, 2012

(65) Prior Publication Data

US 2012/0225276 A1    Sep. 6, 2012

Related U.S. Application Data

(60) Provisional application No. 61/449,021, filed on Mar. 3, 2011.

(51) Int. Cl.
*B29C 44/00* (2006.01)
*B29C 70/46* (2006.01)
*B29C 44/12* (2006.01)
*C08J 9/00* (2006.01)
*C08J 9/32* (2006.01)

(52) U.S. Cl.
CPC .......... *B29C 70/465* (2013.01); *B29C 44/1209* (2013.01); *C08J 9/0085* (2013.01); *C08J 9/32* (2013.01); *C08J 2203/22* (2013.01); *Y10T 428/249953* (2015.04)

(58) Field of Classification Search
CPC ............ B29C 44/1209; B29C 44/1214; B29C 44/1276; B29C 44/1285; B29C 70/546; B29C 67/222; B29C 67/2214; B29C 67/2215; B29C 44/1278

USPC ................................. 264/155, 45.3, 136–137
See application file for complete search history.

(56) References Cited

U.S. PATENT DOCUMENTS

| 3,634,184 | A | * | 1/1972 | Wang | ............................... 442/64 |
| 4,357,386 | A | * | 11/1982 | Luciano et al. | ................. 442/30 |
| 4,865,784 | A | | 9/1989 | Hill | |
| 5,773,121 | A | | 6/1998 | Meteer et al. | |
| 6,864,297 | B2 | * | 3/2005 | Nutt et al. | ........................ 521/54 |
| 2008/0003906 | A1 | * | 1/2008 | Hill et al. | ....................... 442/221 |

FOREIGN PATENT DOCUMENTS

WO     WO2004009681     1/2004

OTHER PUBLICATIONS

WIPO, Written Opinion and International Search Report for corresponding PCT Patent Application Serial No. PCT/CA2012/000181 mailed May 29, 2012.

* cited by examiner

*Primary Examiner* — Christina Johnson
*Assistant Examiner* — Xue Liu
(74) *Attorney, Agent, or Firm* — Bereskin & Parr LLP

(57) ABSTRACT

According to one aspect, a method of forming foam composites. The method includes providing a plurality of microspheres in contact with a fiber pre-form having a plurality of fibers, inserting at least one penetrating element into the fiber pre-form, and repeatedly moving the at least one penetrating element within the fiber pre-form so as to encourage the plurality of microspheres to disperse within the fiber pre-form. The fiber pre-form with the microspheres dispersed therein is then heated, causing the microspheres to expand and fuse together to form the foam composite.

22 Claims, 5 Drawing Sheets

METHODS AND APPARATUS FOR MAKING FOAM COMPOSITES REINFORCED WITH FIBERS AND FIBER PRE-FORMS HAVING PARTICLES THEREIN

RELATED APPLICATIONS

This application claims the benefit of U.S. Provisional Patent Application Ser. No. 61/449,021 filed Mar. 3, 2011, and entitled METHODS FOR MAKING FOAM COMPOSITES REINFORCED WITH FIBERS AND FIBER PRE-FORMS HAVING PARTICLES THEREIN, the entire contents of which are hereby incorporated by reference herein for all purposes.

TECHNICAL FIELD

The embodiments disclosed herein relate to composite materials, and in particular to methods and apparatus for making foam composite members that are reinforced with a plurality of fibers, foam composite members formed according to such methods, and methods of making fiber pre-forms.

INTRODUCTION

Rigid polymer foams are widely used as core materials for various engineering applications, including for example high-performance aerospace applications, marine applications (e.g. boats), turbine blades and other components for windmills (e.g. for wind power), structural panels (e.g. in recreational vehicles), and so on. Depending on the particular application, desired attributes may include low density, good insulating properties (e.g. thermal insulation, sound insulation, or both), good energy absorption, and low cost.

A wide variety of polymeric foams are commercially available, and include both thermoset and thermoplastic types. Many high-performance structural foams are formed by expanding liquid polymers to form rigid, low-density foams. Some foams made this way include polymethacrylimide (PMI) and partly cross-linked polyvinyl chloride (PVC), with trade names Rohacell® and Divinycell®, for example.

In some cases, foam performance can be enhanced by fiber reinforcement. For example, a low viscosity mixture of liquid resin and foaming agents may be injected into a mold containing a fiber mat with short, randomly oriented fibers. The mixture then expands to penetrate the mat, forming the foam composite. However, using liquid resins in this manner has some limitations. For example, the expanding foam tends to displace the fibers in the fiber mat rather than impregnate the fibers, which may have a negative effect on the distribution of the fibers which can impact the performance of the resulting foam composites.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Figure 1:
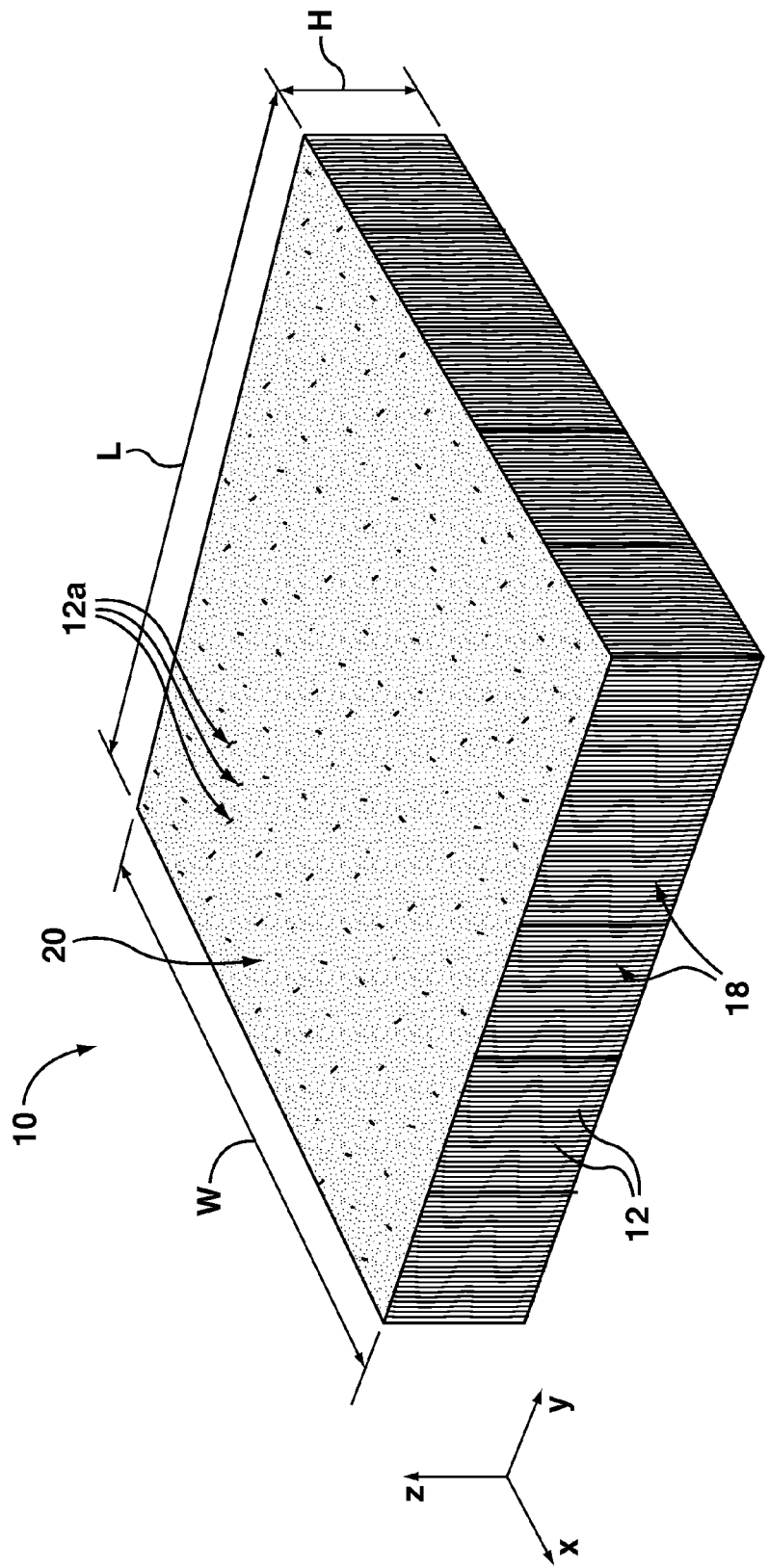
FIG. 1 is a perspective view of a foam composite panel reinforced with fibers made according to one embodiment.

As discussed in the introduction, some known foam composites are formed using a low viscosity mixture of liquid resin and foaming agents that are injected into a mold containing a fiber mat. However, the use of a liquid process has limitations and may not be suitable for some applications.

An alternative approach to using liquid resins for forming foam composites is discussed in U.S. Pat. No. 6,864,297 (Nutt et al.). Nutt describes forming composite foam using expandable microspheres that are reinforced with fibers. In particular, Nutt describes placing a (dry) blended mixture of expanded and unexpanded microspheres (e.g. thermoplastic polyacrylonitrile (PAN) microspheres) onto a randomized fiber pre-form in a mold. The entire mold was then vibrated (e.g. for 20 mins) to cause the microspheres to infiltrate the fibers. Once infiltrated, the mold was then closed and heated (e.g. to 150 degrees Celsius for 20 mins) to expand the microspheres and fuse them together into a composite foam.

The use of microspheres by Nutt is a "dry" technology, and may have improved performance as opposed to using liquid resins, in addition to shorter processing times. However, the approach proposed by Nutt has some disadvantages.

Firstly, it may be generally desirable in some applications to increase the fiber length in the fiber pre-form, since this will tend to provide increased performance of the resulting foam composite (e.g. improved crack resistance, tensile strength, etc.). For example, long fibers deeply anchor foam composites and bridge crack wakes, resisting crack growth and delaying catastrophic failures of the foam composites. As such, increasing fiber length is normally considered to increase the performance of foam composites.

However, increasing the fiber length tends to make the fiber pre-form less permeable to microspheres. Accordingly, using the methods described by Nutt with longer fibers or with high loft pre-forms (for example with fibers greater than one inch in length, or with performs of more than one inch in height) tends to result in localized regions of poor fiber-foam and inter-microsphere adhesion. This effect diminishes the performance increases associated with increasing fiber length. As a result, the techniques described by Nutt are not well suited for foam composites with longer fibers.

Secondly, vibrating an entire mold containing the microspheres and a fiber pre-form (as described by Nutt) can cause "fluidization" of the microspheres within the fiber pre-form, which can lead to local variations in particle dispersion. This is particularly problematic where the microspheres include particles of different sizes, shapes and/or densities, since it can lead to undesired separation or "de-mixing" of the different types of microspheres. In particular, "heavier" particles tend to settle to the bottom while "lighter" particles remain on top.

For example, vibrating an entire mold with microspheres of different sizes and densities (e.g. a blend of expanded microspheres and unexpanded microspheres) using the techniques of Nutt tends to lead to the stratification or "layering" of the different sizes of microspheres within the fiber pre-form, with the larger (and less dense) expanded microspheres remaining on top, while smaller (and denser) unexpanded microspheres tend to sink to the bottom. This non-homogeneous microsphere distribution can negatively impact performance of the final foam composite, and may result in fiber-rich pockets or voids in the foam composite that are generally undesirable.

Accordingly, the embodiments as described herein attempt to address one or more of the issues present with Nutt's techniques. In particular, some embodiments described herein may generally provide for improved control of particle dispersion within a fiber pre-form, and in particular may provide for a more homogeneous microsphere distribution within fiber pre-forms, particularly when using longer fibers and microspheres of various sizes, shapes, and/or densities.

According to one embodiment, a method of forming foam composites includes a first step of providing a plurality of particles (e.g. microspheres) in contact with a fiber pre-form having a plurality of fibers. For example, a plurality of microspheres may be placed onto a surface of a fiber pre-form. The fiber pre-form may include a number of generally aligned fibers (e.g. fiber bundles secured to a backing), may have a plurality of randomly arranged fibers (e.g. a random pre-form), or various combinations thereof. In some embodiments, the fiber pre-form could be a high pile fabric or a tufted fabric.

At least one penetrating element is then inserted into the fiber pre-form. For example, one or more needles, pins or wires may be inserted into the fiber pre-form.

The penetrating elements (e.g. needles) are then repeatedly moved (e.g. vibrated or oscillated) within the fiber pre-form so as to effect movement of the fibers within the pre-form. This fiber movement allows the particles (e.g. microspheres) to "fall" into the fabric pre-form and tends to encourage dispersion of the particles into the pre-form.

In particular, the movement of the penetrating elements is believed to provide for a localized movement of the fibers within the fiber pre-form that allows the nearby particles to fall down into the fibers, generally with a fairly good amount of control. This localized effect is believed to avoid or at least inhibit the fluidization effect present with the techniques described by Nutt.

For example, since the penetrating elements can act at particular depths to move the fibers within the fiber pre-form, the fiber movement can occur along at least a portion of the fibers and at specific regions of the fibers, in some instances at a distance from the interface surface between the fabric pre-form and the loose particles on the surface thereof. This may encourage the particles to become quickly dispersed generally throughout the fiber pre-form at specific depths relative to the height of the fibers (or at least a substantial portion thereof) before any significant stratification or de-mixing effects can occur.

The inventors believe that this generally mitigates the negative effect of long fibers on microsphere distribution, and thus may help overcome at least some of the performance limitations present with the techniques taught by Nutt. In particular, the techniques as used herein may be suitable for use with "high loft" pre-forms wherein the pre-form is quite thick (e.g. between one inch and four inches), or wherein the fibers themselves are quite long (e.g. greater than one inch).

Once microsphere particles are dispersed within the fiber pre-form to a desired amount, the fiber pre-form and microspheres can be heated (e.g. to between 200 degrees Fahrenheit and 300 degrees Fahrenheit (or even to 500 degrees Fahrenheit) depending on the properties of the microspheres and fibers) with pressure (e.g. between 50 and 250 psi depending on the properties of the microspheres and fibers, the desired shape of the foam composite and the particular thickness of the foam composite). The heat causes the microspheres to expand and fuse together so as to encapsulate the fibers, forming the foam composite. The pressure (from a closed mold for example) controls the resulting shape of the foam composite allowing for different shapes to be formed (e.g. a flat panel, a curved panel, etc.).

In some embodiments, after being formed further processing steps may be performed on the foam composite. For example, some density variations may be present in the foam composite due to temperature gradients present during the forming of the foam composite (e.g. microspheres adjacent the surfaces of the foam composite may have experienced greater relative temperatures than microspheres at or near the center of the foam composite, and thus may have expanded by a greater amount). Accordingly, in some embodiments at least a portion of the exterior surfaces of the foam composite may be removed (e.g. by cutting or slicing) to provide a finished foam composite product with a more homogeneous density.

In some embodiments, the foam composite may be cut to desired shapes and sizes. For example, the foam composite could be formed as a relatively thick block that is then cut to form thinner panels (or into different shapes) for desired applications.

Generally, in some embodiments the penetrating elements may be repeatedly moved (e.g. vibrated or oscillated) within the fiber pre-form so as to provide a generally homogenous dispersion of particles (e.g. microspheres or other particles), within the fiber pre-form, even when the particles are of different types with different mechanical properties (e.g. size, weight, density, etc.). For example, one or more penetrating elements may be inserted into the fiber pre-form to a particular depth (e.g. 75% of the height of the fiber pre-form from the pre-form/particle interface) and then oscillated at a frequency and for a duration selected so as to encourage a generally homogeneous distribution of microspheres within the fiber pre-form adjacent each penetrating element.

This may be particularly beneficial where the particles include first microspheres having a first density (e.g. expanded microspheres with a density of 60 kg/m^3) and second microspheres having a second density (e.g. unexpanded microspheres with a density of 1200 kg/m^3), since the stratification or layering effects present with the Nutt techniques tend to be inhibited.

In some embodiments, localization effects may be further facilitated by using a mesh or grid to help control the movement and/or positioning of the microspheres. For example, a honeycomb or other shaped mesh may be placed onto the fiber pre-form to define a plurality of cells. Particles (e.g. microspheres) may then be provided within the cells of the mesh in contact with the fiber pre-form. A needle or other penetrating element may be inserted into each cell to a particular depth and then vibrated so as to encourage the particles within that particular cell to disperse within the fiber pre-form (generally around the needle).

Since the techniques as described herein generally provide for localized vibration, particles tend to be entrained along at least a portion of the length of the fibers (generally regardless of the fiber length) before "stratification" or "de-mixing" effects become significant.

In some embodiments more precise control of the dispersion of microspheres in each cell may be achieved by controlling operating parameters such as the frequency of oscillation and duration of a penetrating element within each cell. For example, each cell could be provided with a penetrating element that vibrates for a particular duration at a particular frequency selected so as to encourage dispersion of the specific microspheres within that cell, without generally allowing for fluidization.

In some other embodiments, no mesh or grid need be used. For example, a powder scattering machine may be used to provide particles onto the surface of the fiber pre-form. The penetrating elements may then be repeatedly moved within the fiber pre-form to disperse the particles therein.

In some embodiments, depending on the operation of the penetrating elements, dispersion of different types of microspheres to different depths within the fiber pre-form may be effected. For example, a first layer of particles may be placed onto the fiber pre-form (e.g. using a powder scattering machine) and then dispersed therein to a first depth by vibrating the penetrating elements. Then, a second layer of particles (which could be of a different type) could then be placed onto the fiber pre-form and dispersed therein (e.g. to a second depth) by vibrating the penetrating elements therein (in some cases with the penetrating elements at a different depth). Accordingly, in some embodiments the techniques as described herein may be used to provide non-homogeneous particle distribution within a fiber pre-form by controlling the type and dispersion location of the particles as well as the depths of the penetrating elements.

In some embodiments, the penetrating elements are oscillated or vibrated at one or more frequencies selected to provide the desired dispersion effects. In some embodiments, the frequency may be between about 1 Hz and 1000 Hz. In some embodiments, the frequency may be between about 200 Hz and 800 Hz. In some embodiments, the penetrating elements could be repeatedly moved with a frequency of around 600 Hz. In other embodiments, higher or lower frequencies may be used depending on the properties of the fibers and microspheres, and other factors.

In some embodiments, the direction(s) of movement of the penetrating elements as they repeatedly move within the fiber pre-form may be selected to achieve a desired dispersion of microspheres therein. For example, in embodiments where the fibers are generally aligned in a first longitudinal direction, and the penetrating elements include needles or rigid wires, the needles may be aligned with the first direction and oscillated longitudinally (e.g. in a direction aligned with the first direction), transversely (e.g. in one or more directions generally perpendicular to the first direction), in an orbital path or a path with at least some curved component (e.g. in a circular pattern, an elliptical pattern, a figure eight pattern, and so on), or generally any other direction or combination of directions as suitable depending on the properties of the fibers and particles.

In some embodiments, the fiber pre-form may be formed by securing a plurality of fiber bundles (with fibers aligned in the first direction) to a backing (e.g. using an adhesive) as will be described below. In other embodiments, the fiber pre-form may be a high pile fabric, a tufted fabric, a randomized fiber mat, or have various other shapes or configurations.

Turning now specifically to FIG. 1, illustrated therein is a foam composite panel 10 reinforced with fibers 12 made according to one embodiment. As shown, the foam composite 10 includes a plurality of fibers 12 that are generally aligned in a first direction (e.g. along the z-direction illustrated by the coordinate system shown in FIG. 1). The foam composite 12 also has a plurality of microspheres 20 dispersed therein using the techniques as described herein. In some cases, some of the tips 12a of the fibers 12 may be partially exposed.

The foam composite 10 in this embodiment is a flat rectangular panel with a width W and a length L. The magnitude of the width W and length L could vary according to the desired applications and the limitations of the particular manufacturing equipment. For example, in some embodiments the width W could be around 4 feet while the length L is around 8 feet. In other embodiments, the foam composite 10 could be square (e.g. the width W and the length L could be equal).

In some embodiments, the foam composite 10 could have other shapes (e.g. could be non-flat with one or more curves along the width W or length L, the foam composite could be circular with a particular diameter, could be elliptical, and so on).

As shown, the foam composite 10 also a height H, which in this embodiment is determined by the pre-form height H, as will be explained further below. In some embodiments the height H may be greater than one inch. In some embodiments the height H may be between about one inch and four inches. In other embodiments the height H may be greater than four inches.

Figure 2:
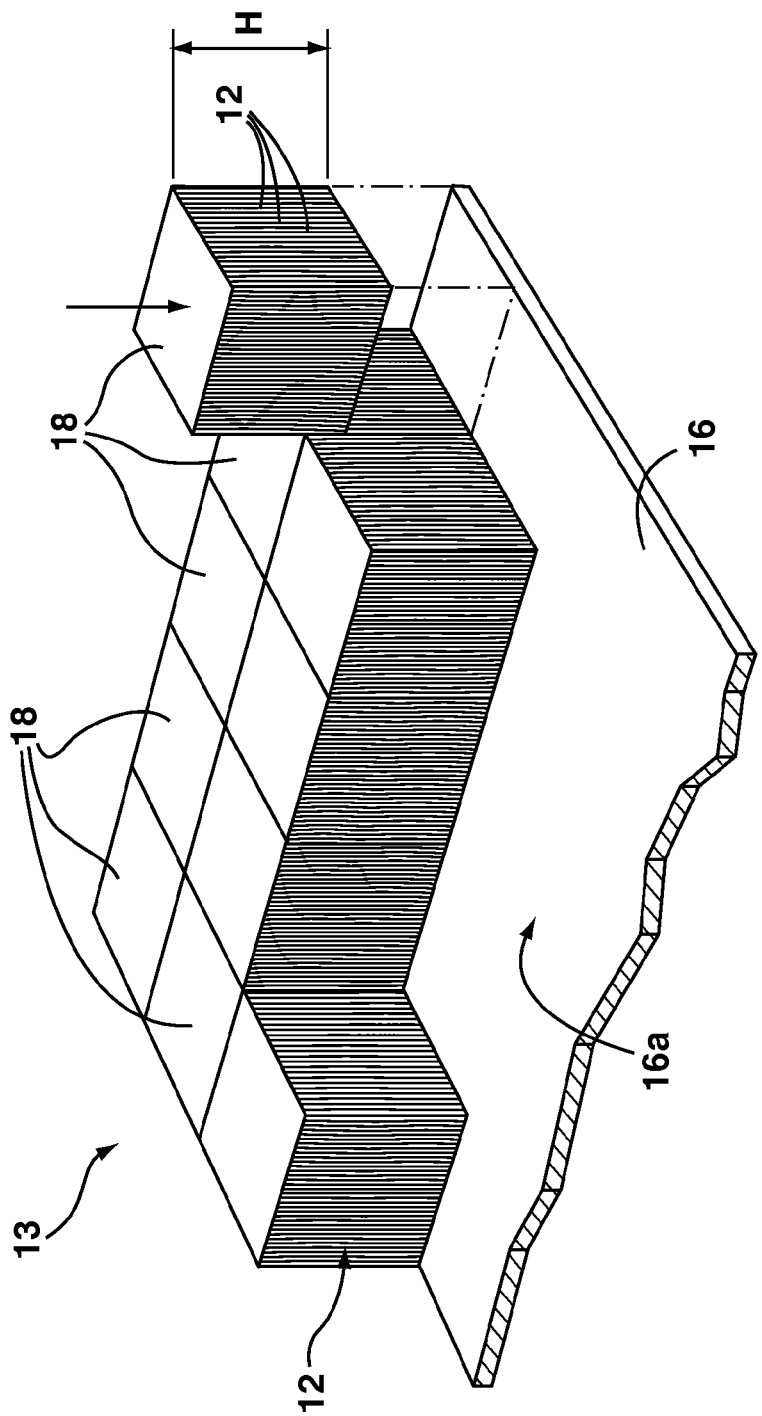
FIG. 2 is perspective view of a fiber pre-form for use in forming a foam composite.

Generally, as described above the foam composite 10 may be formed from a fiber pre-form that is brought into contact with a plurality of microspheres. One example of a fiber pre-form 13 is shown in FIG. 2.

In this embodiment, the fiber pre-form 13 may be formed by securing a plurality of fiber bundles 18 to a backing member 16. As shown, each fiber bundle 18 having a height H, may include a plurality of fibers 12 aligned in the first direction. This fiber alignment may be beneficial depending on the particular application that the foam composite will be used. The fiber bundles 18 may be secured to the top surface 16a of the backing member 16. For instance, the backing member 16 may be a silicone mat with a pressure sensitive adhesive (PSA) thereon, and which may be activated when the fiber bundles 18 are placed onto the top surface 16a. In other embodiments, the fiber pre-form may have various other shapes and sizes. For example, the fiber pre-form may be a high pile fabric or a tufted fabric. The fiber pre-form may be circular, may include non-aligned fibers (e.g. fibers with random fiber orientations), or may have other fiber orientations (e.g. woven fibers, unidirectional fibers), and so on.

In some embodiments, the length of the fibers 12 may be such that the fibers 12 could be considered "long fibers", in that they would tend to interfere with microsphere dispersion when using the techniques described by Nutt. In particular, pre-forms consisting of fibers 12 longer than one inch tend to impede the effectiveness of the techniques as described by Nutt.

In some embodiments, the fibers may have a length of at least 10 mm. In some embodiments, the fibers 12 have a length of at least 30 mm. In some embodiments, the fibers 12 have a length of at least 50 mm.

In some embodiments, the fibers used to generate a pre-form may be in the 1 inch to 3 inch range, and may be used to create high loft pre-forms with lofts of 4 inches or more. In general, the pre-form may include discontinuous filaments or fibers that collectively provide the pre-form with the height H.

Figure 3:
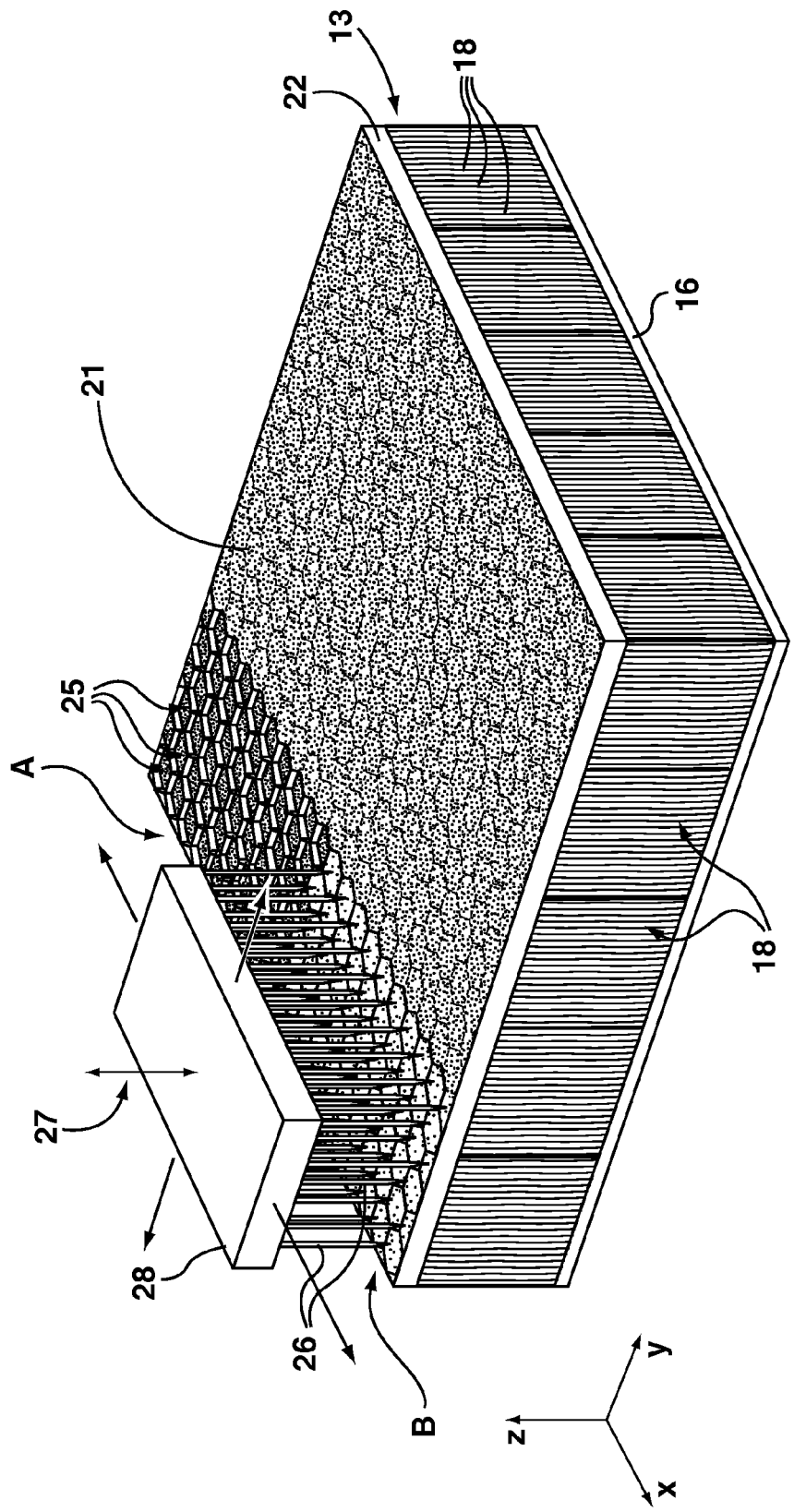
FIG. 3 is a perspective view of a fiber pre-form with particles thereon and a penetrating apparatus for dispersing the particles within the fiber pre-form.

Turning now to FIG. 3, as shown therein a plurality of loose, dry microspheres 21 have been placed onto the top surface of the fiber pre-form 13, for example by using a powder scattering machine. As also shown, an optional mesh 22 has been placed onto the fiber pre-form 13 to define a plurality of cells 25 that secure the loose microspheres 21 therein. In other embodiments, the microspheres 21 (or other particles) may be placed onto the fiber pre-form 13 without a mesh.

Also shown in FIG. 3 is a penetrating apparatus 27. In this embodiment, the penetrating apparatus 27 includes one or more penetrating elements 26 (e.g. needles, wires or other elongate members) secured via a body member 28.

As shown, in this embodiment the penetrating apparatus 27 is smaller than the fabric pre-form 13, and thus may be moved between regions of the fabric pre-form 13 to effect microsphere 21 dispersion. For example, in this figure, the penetrating apparatus 27 has already been used in a first region A to disperse microspheres 21 through the fiber pre-form 13, and the penetrating apparatus 27 is positioned above a second region B and ready to be inserted into the fiber pre-form 13.

In other embodiments, the penetrating apparatus 27 may be large enough to cover the entire pre-form 13. This may be beneficial as using the penetrating apparatus 27 in separate regions (e.g. the first region A and second region B) may cause irregularities at the boundaries between regions (e.g. over or under dispersion of particles).

In some embodiments, the penetrating elements (e.g. one or more needles) 26 may be inserted at or near the centre of each cell 25 of the mesh 22 when effecting dispersion of the loose microspheres 21. In some embodiments, a honeycomb shaped mesh 22 may be particularly beneficial since it tends to provides cells 25 that are close in shape to a circle, and thus tending to provide for relatively uniform distribution of loose microspheres 21 around the penetrating elements 26 while still allowing the cell 25 pattern to be repeated or "tiled" to cover the surface of the fiber pre-form 13.

Figure 4:
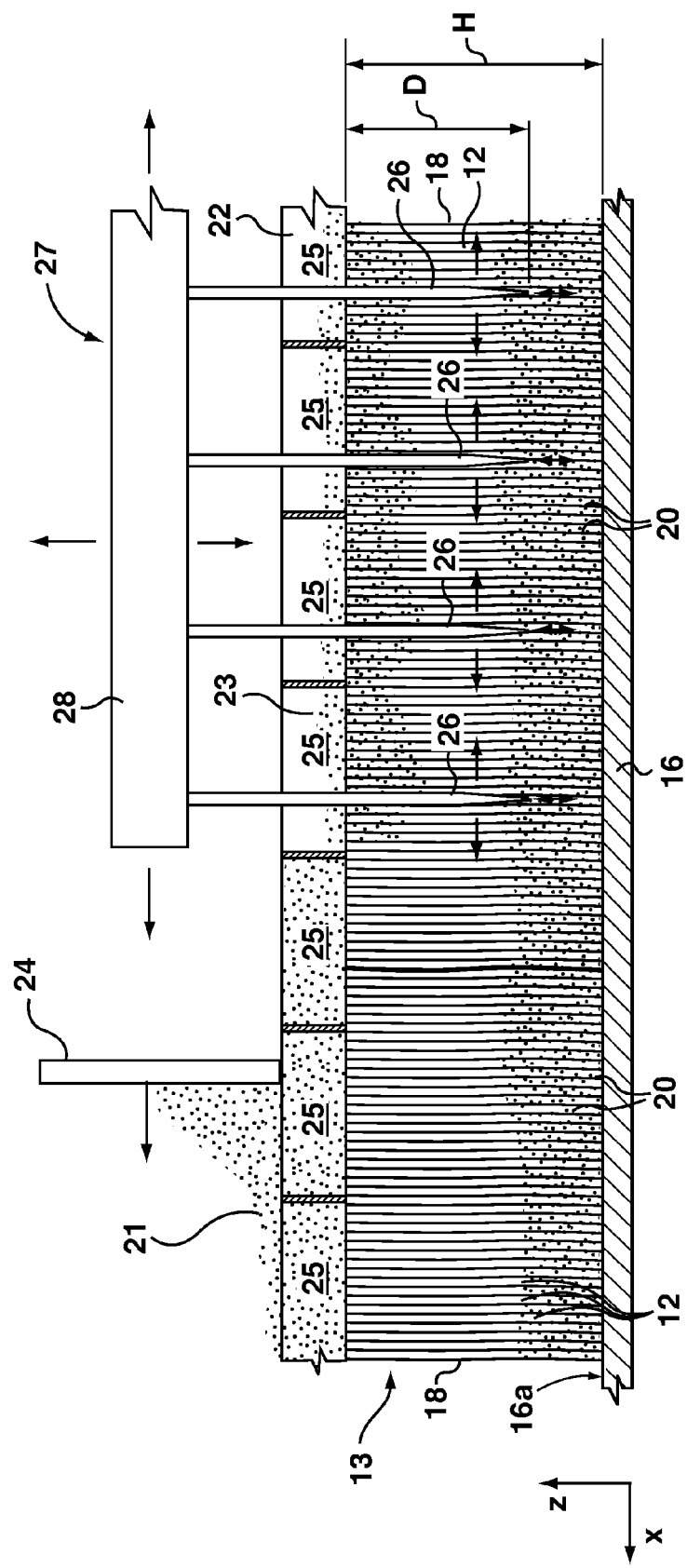
FIG. 4 is a side schematic view of the penetrating apparatus inserted into the fiber pre-form and positioned to vibrate within the fabric pre-form.

Turning now to FIG. 4, as shown the penetrating element 27 has been moved towards the fiber pre-form 13, and the penetrating elements 26 are inserted into the fiber pre-form 13 to a depth D. Generally the depth D is at least slightly less than the height H of the pre-form 13. In this embodiment, the fiber pre-form 13 includes a plurality of fibers 12 that extend along the first direction (e.g. aligned with the z-axis) and which are arranged to give the pre-form 13 its height H. Loose microspheres 21 (or other particles) are provided on top of the fiber pre-form 13.

The penetrating apparatus 27 is then repeatedly moved (e.g. by vibrating the body member 28) in one or more directions, such as the x-direction, the z-direction, the y-direction (not shown), or various combinations thereof and according to various patterns. This repeated movement or vibration disturbs the fibers 12 within the fiber pre-form 13 so that the microspheres 21 will tend to fall down into the fiber pre-form 13 and become dispersed within the fibers 12 (indicated generally as dispersed microspheres 20).

Generally, operating parameters such as the frequency of vibration, duration of vibration, and depth of penetration D of the penetrating elements 26 may be selected so as to achieve the desired dispersion of microspheres 20 within the fiber pre-form 13.

In particular, the depth D of the penetrating elements 26 may be selected so that at least a substantial portion of the length of the fibers 12 is disturbed as the penetrating elements 26 are vibrated. This tends to allow the loose microspheres 21 to fall quickly into the fibers 12 before "de-mixing" or "fluidization" effects can become significant, which could otherwise lead to a non-homogeneous distribution of the microspheres 20 within the fiber pre-form 13. Accordingly, this technique tends to mitigate the negative effects of long fibers on microsphere dispersion.

In some embodiments, a scraper 24 or other element may be used to remove excess loose microspheres 21 from the surface of the mesh 22 prior to vibration. In this manner, the cells 25 of the mesh 22 may also serve as a measurement tool for ensuring that the desired quantities of loose microspheres 21 are provided for dispersion within the fiber pre-form 13.

In some embodiments, the depth D is at least 5% of the height H of the pre-form 13 from the top surface of the pre-form 13. In some embodiments, the depth D is at least 50% of the height H of the pre-form 13. In some embodiments, the distance D is at least 75% of the height H of the pre-form 13. In some embodiments, the distance D is at least 90% of the height H of the pre-form 13.

In some embodiments, microspheres 20 (or other particles) may be added to the fiber pre-form 13 in more than one pass of the penetrating apparatus 27. For example, a first batch of loose microspheres 21 may be placed in contact with the fiber pre-form 13 and then dispersed therein using the penetrating apparatus 27 (e.g. with the penetrating elements 26 positioned at a first depth in the fiber pre-form 13, for example 90% of the height of the fibers 12). Then, a second batch of loose microspheres 21 may be placed onto the fiber pre-form 13, and dispersed therein using the penetrating apparatus 27 (e.g. with the penetrating elements 26 positioned at a second depth in the fiber pre-form 13, for example 50% of the height of the fibers 12).

Accordingly, the dispersion of microspheres 20 or other particles within the fiber pre-form 13 may generally be controlled with good accuracy and precision to achieve desired dispersion of microspheres 20, generally without significant fluidization or stratification effects occurring.

In some embodiments, after the microspheres 20 have been dispersed within the fiber pre-form 13, the top of the fiber pre-form 13 may then be covered (e.g. with a film, reusable sheet, metal cover, etc.) for example to inhibit dust from contaminating the fiber pre-form 13, to inhibit egress of the microspheres 20 (or both), for example when transporting the fiber pre-form 13. In some examples, the mesh 22 may be removed before the fiber pre-form 13 is covered.

In some embodiments, the grid or mesh 22 could be used for microsphere application onto the pre-form, but the mesh 22 should be removed prior to inserting the penetrating elements 26. In particular, inserting the penetrating elements 26 into the cells of the mesh 22 may not be a likely manufacturing scenario because alignment of the penetrating elements with the mesh 22 can be extremely difficult. For instance, it can be quite difficult to ensure that the penetrating elements are perpendicular with the body member 28.

Once the microspheres 20 are dispersed, the fiber pre-form 13 with microspheres 20 can then be heated with pressure, causing the microspheres 20 to expand and fuse together so as to form the foam composite 10. For example, in some embodiments the fiber pre-form 13 with microspheres 20 can then be heated to between 200 degrees Fahrenheit and 300 degrees Fahrenheit, or in some embodiments to 500 degrees Fahrenheit (depending on the type of particular microspheres 20) to achieve the desired degree of microsphere expansion while under pressure (e.g. between 50 psi and 250 psi, around 125 psi, etc.) to control the expansion of the microspheres 20 and assist the foam composite 10 in adopting a desired shape and thickness.

In some embodiments, some of the fibers 12 in the fiber pre-form 13 may be treated, for example to improve adhesion of the microspheres 20 thereto, to facilitate dispersion of the microspheres 20 therein, and so on.

Figure 5:
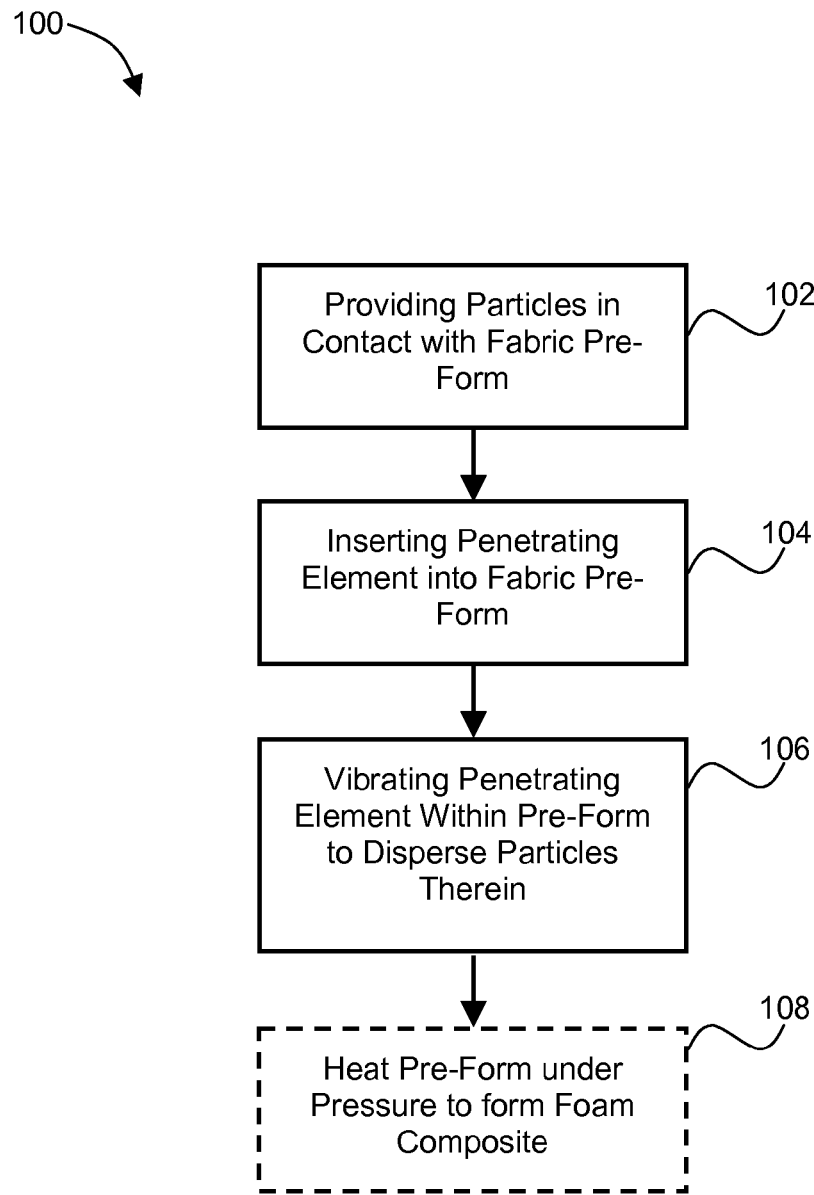
FIG. 5 is a flowchart showing a method of vibrating a penetrating apparatus within a fiber pre-form that is in contact with particles.

Turning now to FIG. 5, illustrated therein is a method 100 of dispersing particles in a fiber pre-form according to one embodiment, and which may be used for forming foam composites or for other applications.

At step 102, a plurality of particles is provided in contact with a fiber pre-form that has a plurality of fibers. The particles could be placed or distributed onto a top surface of the fiber pre-form using a powder scattering machine, for example. In some embodiments, the particles could be microspheres, and may include two or more types of microspheres, such as expanded and unexpanded microspheres or microspheres with different densities or properties. In other embodiments, the particles could include other particles, such as homopolymers, block polymers, engineered thermoplastics, thermosets, and so on.

At step 104, at least one penetrating element is inserted into the fiber pre-form. For example, one or more needles, wires or other elongate elements may be inserted into the fiber pre-form to a particular depth.

At step 106, the at least one penetrating element is repeatedly moved (e.g. vibrated or oscillated) within the fiber pre-form. This vibration causes movement of the fibers within the fiber pre-form and encourages the plurality of particles (e.g. microspheres or other particles) to disperse within the fiber pre-form. This vibration may be maintained and/or repeated until a desired distribution of particles is achieved.

In some embodiments (e.g., where the particles are microspheres), at step 108, the fiber pre-form with microspheres dispersed therein may then be heated to a temperature selected to cause the microspheres to expand and fuse together to form the foam composite. In some embodiments, this heating may be done in a mold and under pressure so that the finished foam composite has a desired shape.

In some embodiments, the particles may include one or more microspheres selected from the group consisting of glass, silica-alumina ceramic, epoxy resins, unsaturated polyester resins, silicone resins, phenolics, polyvinyl alcohols, polyvinyl chlorides, polypropylenes, polystyrenes, polyacrylonitrile, polymides, and any combination thereof.

For examples, some microspheres may include thermoplastic polyacrylonitrile (PAN). Each microsphere may include a thermoplastic shell that encapsulates a blowing agent, such as isopentane or butane, or another hydrocarbon blowing agent. Before expansion, microspheres may have a first diameter (e.g. 10 micrometers). After heating to a suitable temperature, the microspheres will expand and may reach a second diameter (e.g. 40 micrometers).

Other suitable particles may not be microspheres.

In some embodiments, particles may include homopolymers such as, but not limited to, polystyrene (a-methyl, brominated), polybutadiene, poly(meth)acrylates, poly(meth)acrylic acids, poly(meth)acrylamides, poly(meth)acrylonitrile, polyethylene (propylene or butylene), polyesters, polyolefins, polyvinylidene fluoride or chloride, polyvinyl acetate, polyvinyl ether, or blends or copolymers of these or other homopolymers thereof.

Other particles could include block polymers, alternating or random copolymers, terpolymers, etc., such as styrene-butadiene (SBR), styrene-acrylonitrile, butadiene-acrylonitrile, styrene-maleic anhydride (SMA), ethylene-(meth)acrylic acid, ethylene glycol (PEG), ethylene terephthalate (PET), acrylonitrile-butadiene-styrene (ABS), and other copolymers or blends of polymers and/or copolymers thereof.

Other particles could include engineered thermoplastic polymers such as nylon, polyamide, polycarbonate, polyimide, polyetherimide, polyketone, polyetherketone, polypropylene, polysulfone, and other thermoplastics or blends of thermoplastic polymers thereof.

Yet other particles could include thermosetting polymers including epoxy, phenolic and polyurethane resin systems, polymers containing one or more reactive functionalities, thermal or photo-initiators, catalysts or other synergists, hollow microballoons, comprised of glass, ceramic, and phenolic resins.

As used herein, the terms "fiber" generally refer to an elongated body for which the length dimension is significantly greater than the transverse or width dimension. In some embodiments, at least one of the fibers may include polyester fibers, aramid fibers, glass fibers, basalt fibers, carbon fibers, or some combination thereof.

In some embodiments, at least some of the fibers may be high-performance fibers such as aramid fibers, extended chain polyethylene fibers, and/or poly(p-phenylene-2,6-benzobisoxazole) (PBO) fibers. Other examples could include aramid and copolymer aramid fibers, for example as produced commercially by DuPont (Kevlar®), Teijin (Twaron®), Kolon (Heracron®), and Hyosung Aramid, modified aramids (e.g. Rusar®, Autex®), ultra high molecular weight polyethylene (UHMWPE) produced commercially by Honeywell, DSM, and Mitsui under the trade names Spectra®, Dyneema®, and Tekmilon®, respectively (as well as Pegasus® yarn), poly(p-phenylene-2,6-benzobisoxazole) (PBO) (produced by Toyobo under the commercial name Zylon®), and/or polyester-polyarylate yarns (e.g. Liquid crystal polymers produced by Kuraray under the trade name Vectran®). In some embodiments, industrial fibers such as Nylon, polyester, polyolefin based yarns (including polyethylene and polypropylene), could also be used.

In some embodiments, the fibers may be made from aliphatic (non-aromatic) low-density polyolefins, such as high-molecular weight polyethylene (HMWPE), polypropylene, and synthetic fibers such as PET or Nylon/Amides.

In some embodiments, at least some of the fibers 12 may be aligned in the fiber pre-form 13. In some embodiments, at least some of the fibers may be configured in a random or pseudo-random fashion in the fiber pre-form.

In some embodiments, it may be advantageous for the particles (e.g. microspheres) to be dispersed homogeneously through the pre-form. In other embodiments, the techniques as described herein may be useful for providing particular non-homogeneous distribution of particles. For example, a first batch of particles dispersed within a fiber pre-form (using the vibrating penetrating elements) may be first microspheres with first properties (e.g. microspheres made from a fire resistant type of thermoplastic) selected to generally form a first layer within the fiber pre-form. A second batch of second microspheres with other properties (e.g. good structural strength but low fire resistance) may then be dispersed on top of the first batch within the fiber pre-form. In this manner, foam composites having various non-homogeneous microsphere or particle arrangements may be provided.

The foam composites 10 described herein can be designed for use in various applications, such as in rigid panels for use in the aerospace industry, marine applications, windmill blades, recreation vehicle panels, and for other uses.

In some embodiments, the foam composites may additionally include additives to control and/or alter the physical or chemical properties of the foam composites, such as nanoparticles to increase toughness of the foam composites and/or fillers to reduce density and/or increase stiffness of the composites. In some embodiments, the foam composites may also contain substances selected so as to alter the surface properties of the composite, such as, for example, dyes for coloring or the like. In some embodiments, such particles may be added along with or in addition to the microspheres by using the penetrating element to vibrate the fibers within the fiber pre-form.

In some embodiments, the methods as described herein may be used to disperse other particles that are not microspheres within a fiber pre-form. For example, in another aspect there may be provided a method of forming a fiber pre-form having particles dispersed therein, comprising providing a plurality of the particles in contact with the fiber pre-form, inserting at least one penetrating element into the fiber pre-form, and vibrating the at least one penetrating element within the fiber pre-form so as to encourage the plurality of particles to disperse within the fiber pre-form.

Generally, the foam composites as described herein may be formed into various shapes and/or sizes. For example, in some embodiments square or rectangular generally flat panels may be formed (e.g. a 4 foot by 8 foot rectangular panel). In other embodiments, foam composites may be formed having various curves or other shapes.

In particular, once a fiber pre-form has been impregnated with the desired microspheres, the fiber pre-form can be placed in mold having a desired shape (e.g. a curved mold) and then heated (e.g. between 200 degrees Fahrenheit and 300 degrees Fahrenheit) under pressure (e.g. at 125 psi) to obtain a desired shape and density (e.g. a density between about 60 kg/m^3 to 250 kg/m^3).

In some embodiments, one or more penetrating elements may be made of a corrosive resistant material, such as stainless steel, in order to inhibit corrosion related to contact with microspheres or environmental factors (or both). In particular, corrosion may negatively impact pin penetration into the pre-form. More particularly, penetrating elements (e.g. pins) exhibiting corrosion may tend to compress the pre-form rather than displace fibers and penetrate into the pre-form as desired.

While the above description provides examples of one or more foam composites and methods of forming the same, it will be appreciated that other foam composites and methods may be within the scope of the present description as interpreted by one of skill in the art.

The invention claimed is:

1. A method of forming a foam composite, comprising:
   providing a plurality of microspheres in contact with a fiber pre-form on a base, the fiber pre-form having a plurality of fibers, wherein the plurality of fibers are generally oriented in a first direction;
   inserting at least one penetrating element into the fiber pre-form along the first direction and to a depth that is less than a height of the fiber pre-form;
   repeatedly vibrating the at least one penetrating element independent of any vibration of the base and while the at least one penetrating element is within the fiber pre-form at the depth in a transverse direction so as to cause localized movement of fibers within the fiber pre-form relative to the base to encourage the plurality of microspheres to disperse within the fiber pre-form; and
   heating the fiber pre-form with the microspheres dispersed therein causing the microspheres to expand and fuse together to form the foam composite.

2. The method of claim 1, wherein repeatedly moving vibrating the at least one penetrating element includes providing a generally homogenous dispersion of microspheres within the fiber pre-form.

3. The method of claim 1, wherein the plurality of microspheres placed in contact with the fiber pre-form includes a plurality of first microspheres having a first density and a plurality of second microspheres having a second density.

4. The method of claim 3, wherein the first density is around 60 kg/m^3 and the second density is around 1200 kg/m^3.

5. The method of claim 3, wherein the first microspheres are expanded microspheres and the second microspheres are unexpanded microspheres.

6. The method of claim 1, wherein the at least one penetrating element is vibrated at a frequency selected so as to encourage a generally homogeneous distribution of microspheres within the fiber pre-form.

7. The method of claim 6, wherein the frequency is between about 1 Hz and 1000 Hz.

8. The method of claim 1, further comprising providing a mesh on the fiber pre-form that defines a plurality of cells, and wherein the plurality of microspheres are provided in contact with the fiber pre-form within the cells of the mesh.

9. The method of claim 1, wherein the at least one penetrating element includes at least one needle.

10. The method of claim 1 further comprising, after the microspheres have been dispersed within the fiber pre-form, encapsulating the top of the fiber pre-form and microspheres with a film.

11. The method of claim 1, wherein the fiber pre-form has a height and wherein the at least one penetrating element is inserted into the fiber pre-form by a depth of at least 5% of the height during movement of the at least one penetrating member.

12. The method of claim 1, wherein the fiber pre-form has a height and wherein the at least one penetrating element is inserted into the fiber pre-form by a depth of at least 50% of the height during movement of the at least one penetrating member.

13. The method of claim 1, wherein the fiber pre-form has a height and wherein the at least one penetrating element is inserted into the fiber pre-form by a depth of at least 75% of the fiber height during movement of the at least one penetrating member.

14. The method of claim 1, wherein the fiber pre-form has a height and wherein the at least one penetrating element is inserted into the fiber pre-form by a depth of at least 90% of the fiber height during movement of the at least one penetrating member.

15. The method of claim 1, wherein the fiber pre-form and microspheres are heated to between 200 degrees Fahrenheit and 500 degrees Fahrenheit.

16. The method of claim 1, wherein the fiber pre-form and microspheres are heated while under pressure.

17. The method of claim 16 wherein the pressure is between 50 psi and 250 psi.

18. The method of claim 1, wherein the foam composite has a density of between about 60 kg/m^3 and 250 kg/m^3.

19. A method of dispersing a plurality of particles in a fiber pre-form, comprising:
   providing a plurality of the particles in contact with the fiber pre-form on a base, wherein the fiber pre-form has a height H;
   inserting at least one penetrating element into the fiber pre-form to a depth D that is less than the height H of the fiber pre-form, wherein each penetrating element is aligned with a first direction and moves along the first direction when being inserted into the fiber pre-form; and
   repeatedly vibrating the at least one penetrating element independent of any vibration of the base and while the at least one penetrating element is within the fiber pre-form at the depth D in a transverse direction that is perpendicular to the first direction so as to cause a localized movement of fibers within the fiber pre-form relative to the base that encourages the plurality of particles to disperse within the fiber pre-form.

20. The method of claim 19, wherein repeatedly vibrating the at least one penetrating element includes providing a generally homogenous dispersion of microspheres within the fiber pre-form.

21. The method of claim 19, wherein the plurality of particles includes first particles having a first density and second particles having a second density.

22. The method of claim 1, further comprising:
removing the at least one penetrating element from the fiber pre-form without penetrating through the fiber pre-form.

* * * * *